Nov. 22, 1927.
H. L. CARR
CULTIVATOR TOOTH
Filed June 20, 1925
1,650,007
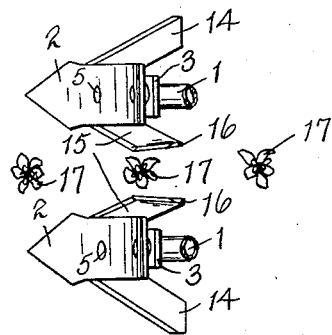
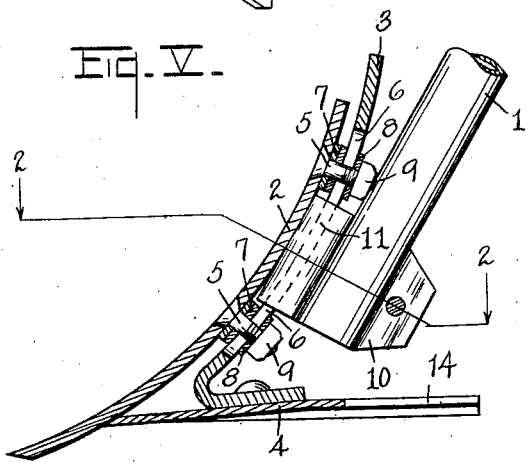
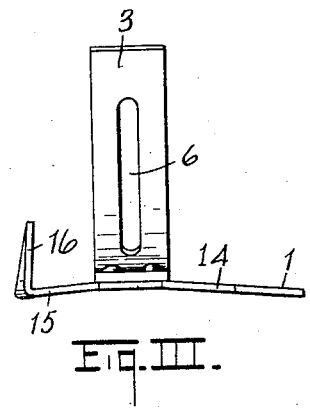
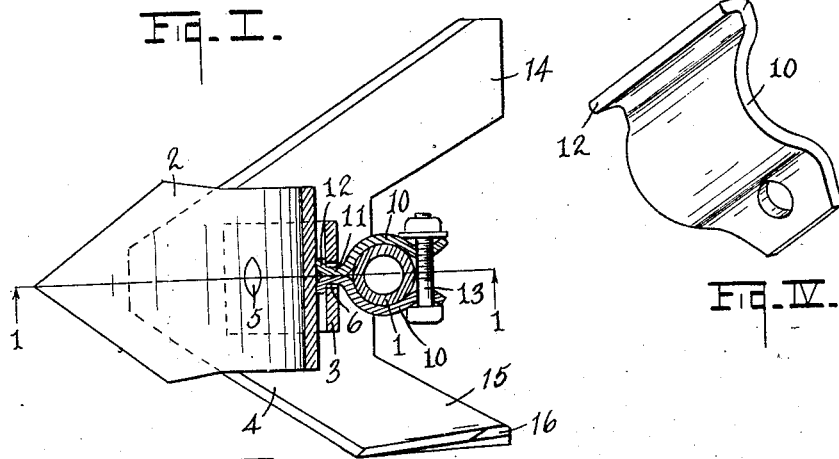
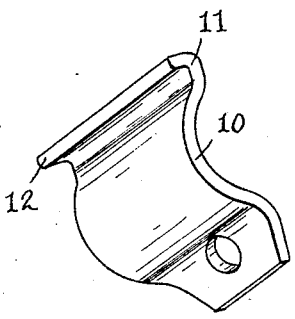
INVENTOR
Harry L. Carr
BY Chappell & Earl
ATTORNEYS Patented Nov. 22, 1927.

1,650,007

UNITED STATES PATENT OFFICE.

HARRY L. CARR, OF HASTINGS, MICHIGAN.

CULTIVATOR TOOTH.

Application filed June 20, 1925. Serial No. 38,534.

This invention relates to improvements in cultivator teeth.

The main objects of this invention are:

First, to provide an improved cultivator tooth which is very effective as a weed destroyer and in thoroughly working the ground.

Second, to provide an improved cultivator tooth comprising a shovel and a blade with effective means for securing to a round shank.

Objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a fragmentary view partially in vertical section on a line corresponding to line 1—1 of Fig. II of a cultivator tooth embodying the features of my invention.

Fig. II is a section on a line corresponding to line 2—2 of Fig. I.

Fig. III is a rear view of the blade and its shank.

Fig. IV is a perspective view of one of the clamp members, the clamp members being duplicates.

Fig. V is a fragmentary plan view showing a pair of my improved cultivator teeth in their operative relation to a row of vegetation conventionally shown.

In the drawing similar reference characters refer to similar parts throughout the several views, and the sectional views are taken looking in the direction of the little arrows at the ends of the section lines.

Referring to the drawing, the standard 1 in the embodiment illustrated is a round piece of tubing. The shovel 2 is secured to the shank 3 of the triangular blade 4 by means of bolts 5, these bolts engaging the longitudinal slot 6 in the shank. Spacing washers 7 are arranged between the blade and the shank. Locking washers 8 are preferably inserted between the nuts 9 and the shank. By arranging the bolts 5 through the slots 6 the relative position of the shovel and the blade may be varied as desired within this range of adjustment.

The blade and shovel are secured to the shank by means of the clamp members 10 which are curved to partially encircle the standard and have forwardly projecting lug portions 11 terminating in laterally directed flanges 12 which are engaged within the slot 8.

The clamping bolt 13 is arranged at the rear of the standard so that when the bolt is drawn up the clamp members are not only clamped upon the standard but are clamped within the slot, thus providing in a single clamp, means for clamping the shank and also the standard.

The clamp may be adjusted vertically on the standard and through the adjustable connection from the shovel to the shank considerable range of adjustment is provided for the parts relative to the standard.

The triangular blade 4 in the embodiment illustrated has rearwardly diverging wings 14 and 15, the wing 15 terminating in an upturned deflector 16, this deflector being preferably rearwardly inclined as shown in the drawing so that the blades may be run close to a row of plants being cultivated as indicated at 17, Fig. V. The deflector prevents the throwing of earth upon the plants, at the same time allowing the earth to fall back close to the plants so that no substantial furrows are formed at the sides of the plants.

I am aware that it is common practice to provide shields for cultivator teeth but these shields usually leave more or less of a furrow along the side of the row allowing the sun to strike the roots or dry out the soil around the roots of the plants. By my improvements I am able to stir the soil close to the plants without danger of covering the plants.

My improved cultivator tooth is very efficient as a weed destroyer and in completely stirring the soil, and it also has the advantage of economy of parts and in assembly. I have not attempted to illustrate certain other embodiments and adaptations which I contemplate as I believe the disclosure made will enable those skilled in the art to embody or adapt my improvements as may be desired.

Having thus described my invention, what

I claim as new and desire to secure by Letters Patent is:

1. A cultivator tooth comprising a standard, a shovel, a blade disposed horizontally at the rear of the shovel, a longitudinally slotted shank for said blade disposed between said shovel and standard, bolts arranged through said shovel to engage said slot whereby the shovel and blade are adjustably connected, a pair of clamp members disposed to embrace said standard and provided with laterally turned flanges at their front ends engaged in said slot in said shank, and a clamping bolt disposed through said clamp members at the rear of said standard whereby they are clamped upon the standard and shank.

2. A cultivator tooth comprising a standard, a shovel, a blade disposed horizontally at the rear of said shovel and provided with a shank to which said shovel is secured, said shank having a slot therein, a pair of clamp members disposed to embrace said standard and provided with laterally turned flanges at their front ends engaged with said slot in said shank, and a clamping bolt disposed through said clamp members at the rear of said standard whereby they are clamped to the standard and shank.

3. A cultivator tooth comprising a standard, a shovel, a blade disposed at the rear of said shovel, said blade having a shank to which said shovel is secured, a pair of clamp members disposed to embrace said standard and engaged in an opening in said shank, and a clamping bolt disposed through said clamp members at the rear of the shank whereby they are clamped to the standard and shank.

4. A cultivator tooth comprising a standard, a shovel, a triangular shaped blade having rearwardly diverging wings disposed horizontally with its apex at the rear of said shovel, one of said wings terminating in an upturned deflector, said blade being provided with a shank adjustably secured to said shovel, and means for adjustably securing said blade and shovel to said standard.

5. A cutivator tooth comprising a standard, a shovel, a triangular shaped blade having rearwardly diverging wings disposed horizontally with its apex at the rear of said shovel, one of said wings terminating in an upturned deflector, and means for securing said blade and shovel to said shank.

6. A cultivator tooth comprising a shovel, and a triangular shaped blade having rearwardly diverging wings disposed horizontally with its apex at the rear of said shovel, one of said wings terminating in an upturned rearwardly inclined deflector, the sharpened front edge of said blade being extended into the front edge of said deflector.

7. A cultivator tooth comprising a shovel, and a triangular shaped blade having rearwardly diverging wings disposed horizontally with its apex at the rear of said shovel, one of said wings terminating in an upturned deflector.

8. As an article of manufacture, a cultivator tooth attachment comprising an attaching shank, and a triangular shaped blade having rearwardly diverging wings disposed horizontally, one of the wings terminating in an upturned rearwardly inclined deflector, the sharpened front edge of said blade being continued in the front edge of said deflector.

9. As an article of manufacture, a cultivator tooth attachment comprising an attaching shank, and a triangular shaped blade having rearwardly diverging wings disposed horizontally, one of the wings terminating in an upturned deflector.

10. An implement of the class described comprising a sweep formed of a flat, horizontally disposed intermediate portion and a pair of wings integral with said portion and disposed at opposite inclinations with respect to each other and further projecting rearwardly from said intermediate portion, a supporting element formed of an upstanding arm and a horizontally disposed lower arm seated on and secured to said intermediate portion, each of said wings having the outer side thereof beveled throughout to provide a cutting edge, and each of said wings further inclining downwardly throughout from its inner edge to its cutting edge.

11. An implement of the class described comprising a sweep consisting of a flat, horizontally disposed intermediate portion and a pair of wings disposed at opposite inclinations with respect to each other and projecting rearwardly from said intermediate portion, an upstanding supporting element having a rearwardly extending angularly disposed lower terminal portion seated on and secured to said intermediate portion, and said supporting element provided with means for adjustably securing it to a support.

12. An implement of the class described comprising a sweep formed of a flat, horizontally disposed intermediate portion and a pair of wings integral with said portion disposed at opposite inclinations with respect to each other and further projecting rearwardly from said intermediate portion, a supporting element formed of an upstanding and a rearwardly inclined upper arm and a rearwardly extending horizontally disposed lower arm seated on and secured to said intermediate portion, each of said wings having the outer side thereof beveled throughout to provide a cutting edge, and said upstanding arms having means to provide for adjustably securing it to a support.

13. As an article of manufacture, a cultivator tooth attachment comprising a triangular shaped blade having a flat horizontally disposed intermediate portion, and a pair of wings integral with said portion and disposed at opposite inclinations with respect to each other, each of the wings having the outer side thereof beveled throughout to provide a cutting edge and being inclined downwardly throughout from its inner edge to its cutting edge, and a supporting element secured to and upstanding from said horizontal intermediate portion.

In witness whereof I have hereunto set my hand.

HARRY L. CARR.